(12) United States Patent
Sundvik et al.

(10) Patent No.: US 9,878,274 B2
(45) Date of Patent: *Jan. 30, 2018

(54) HIGH FLOW V-BANK FILTER

(71) Applicant: CAMFIL AB, Trosa (SE)

(72) Inventors: Anders Sundvik, Hagersten (SE);
Daniel Runefelt, Sodertalje (SE)

(73) Assignee: Camfil AB, Trosa (SE)

( * ) Notice: Subject to any disclaimer, the term of this patent is extended or adjusted under 35 U.S.C. 154(b) by 264 days.

This patent is subject to a terminal disclaimer.

(21) Appl. No.: 14/611,839

(22) Filed: Feb. 2, 2015

(65) Prior Publication Data

US 2015/0143783 A1    May 28, 2015

Related U.S. Application Data

(60) Division of application No. 13/859,181, filed on Apr. 9, 2013, now Pat. No. 8,956,433, which is a continuation of application No. 12/023,571, filed on Jan. 31, 2008, now Pat. No. 8,425,644.

(51) Int. Cl.
| | |
|---|---|
| *B01D 46/00* | (2006.01) |
| *B01D 46/12* | (2006.01) |
| *B01D 46/52* | (2006.01) |
| *B01D 46/42* | (2006.01) |

(52) U.S. Cl.
CPC ......... *B01D 46/002* (2013.01); *B01D 46/125* (2013.01); *B01D 46/4227* (2013.01); *B01D 46/521* (2013.01)

(58) Field of Classification Search
CPC .... B01D 46/00; B01D 46/002; B01D 46/125; B01D 46/521; B01D 46/4227

USPC .......... 55/356–357, 478, 482–490, 497, 502, 55/521, DIG. 31
See application file for complete search history.

(56) References Cited

U.S. PATENT DOCUMENTS

| | | | |
|---|---|---|---|
| 2,908,348 A | 10/1959 | Rivers et al. | |
| 2,966,959 A * | 1/1961 | Neumann | B01D 46/125 55/484 |
| 3,999,964 A | 12/1976 | Carr | |
| 4,154,688 A | 5/1979 | Pall | |
| 4,655,921 A | 4/1987 | Fujimoto | |
| 4,673,503 A | 6/1987 | Fujimoto | |

(Continued)

FOREIGN PATENT DOCUMENTS

| | | |
|---|---|---|
| GB | 2 260 916 A | 5/1993 |
| KR | 20050008724 A | 1/2005 |

OTHER PUBLICATIONS

Official Letter dated Apr. 29, 2016, from European Patent Office for European Patent Application No. 13 176 040.7 (4 pgs).

(Continued)

*Primary Examiner* — T. Bennett McKenzie
(74) *Attorney, Agent, or Firm* — Patterson + Sheridan, LLP

(57) ABSTRACT

A V-bank air filter having a high air flow rate with low pressure drop is provided. In one embodiment, a V-bank filter includes a first side panel and a second side panel having parallel first edges oriented perpendicular to a flow direction through the filter. A plurality of filter elements are arranged in at least two pairs of vees extending between the first and second housings. The side panels and the filter elements comprise a unitary disposable filter, wherein at least three filter elements have a unique orientation relative to the flow direction.

12 Claims, 10 Drawing Sheets

(56) References Cited

U.S. PATENT DOCUMENTS

| | | | |
|---|---|---|---|
| 4,685,538 A * | 8/1987 | Kamaike | B66B 1/468 |
| | | | 187/380 |
| 4,746,432 A | 5/1988 | Taki et al. | |
| 5,106,397 A | 4/1992 | Jaroszczyk et al. | |
| 5,302,354 A | 4/1994 | Watvedt et al. | |
| 5,512,074 A | 4/1996 | Hanni et al. | |
| 6,319,300 B1 | 11/2001 | Chen | |
| 6,447,566 B1 * | 9/2002 | Rivera | B01D 46/0005 |
| | | | 55/482 |
| 6,485,538 B1 * | 11/2002 | Toyoshima | B01D 46/0005 |
| | | | 55/482 |
| 7,156,898 B2 | 1/2007 | Jaisinghani | |
| 7,326,387 B2 | 2/2008 | Arts et al. | |
| 7,740,678 B2 | 6/2010 | Gunderson et al. | |
| 8,425,644 B2 | 4/2013 | Sundvik et al. | |
| 2004/0146437 A1 | 7/2004 | Arts et al. | |
| 2004/0261382 A1 | 12/2004 | Baldinger et al. | |
| 2005/0144916 A1 | 7/2005 | Adamek et al. | |
| 2006/0174598 A1 | 8/2006 | Mills et al. | |
| 2006/0254230 A1 | 11/2006 | Powell | |
| 2007/0045167 A1 | 3/2007 | Jaroszczyk et al. | |
| 2007/0204579 A1 | 9/2007 | Karlsson et al. | |
| 2007/0283808 A1 * | 12/2007 | Chung | B01D 39/1623 |
| | | | 95/285 |
| 2008/0017038 A1 | 1/2008 | Wu | |

OTHER PUBLICATIONS

PCT international search report and written opinion of PCT/US2009/032331 dated Aug. 3, 2010.
Extended European Search Report dated May 16, 2011, for corresponding EPO Patent Applicatin No. 09709338.9.
Official Letter dated Jan. 16, 2012, from European Patent Office for corresponding European Patent Application No. 09 709 338.9.

* cited by examiner

HIGH FLOW V-BANK FILTER

CROSS-REFERENCE TO RELATED APPLICATION

This application is a divisional application of the U.S. application Ser. No. 13/859,181 filed Apr. 9, 2013, which in turn is a continuation of U.S. application Ser. No. 12/023,571 filed Jan. 31, 2008, now U.S. Pat. No. 8,425,644, all of which is incorporated herein by reference.

BACKGROUND OF THE INVENTION

Field of the Invention

Embodiments of the invention generally relate to an air filter having two or more V-banks.

Description of the Related Art

V-bank filters are commonly used in air filtration applications where large amounts of filtration media is desirable, typically to provide improved pressure drop over deep pleat filters at high air flow rates. A V-bank filter typically includes two or more pairs of filter banks arranged in a V-configuration. Each bank is comprised of a pleated particulate or gas filter element. Each filter element typically comprises a gas phase or pleated particulate element. Examples of V-bank filters include F2000, Durafil and Riga-RP filters available from Camfil Farr, Inc., among others.

The operational costs associated with filtering air is typically related to the pressure drop across the filter. For example, the easier air can pass through the filter, the less energy is required to drive the air through the filter. The pressure drop is related to the area of media utilized in the filter and the filter's corresponding efficiency. Since selection of the area and type of media is limited, reduction in the resistance of an air filter appears to be limited as well. However, with the ever-increasing cost of energy, it is highly desirable to further reduce the pressure drop across the filter.

Therefore, there is a need for an improved V-bank filter.

SUMMARY OF THE INVENTION

Embodiments of the invention generally relate to a V-bank air filter having a high air flow rate with low pressure drop. In one embodiment, a V-bank filter includes a first side panel and a second side panel having parallel first edges oriented perpendicular to a flow direction through the filter. A plurality of filter elements are arranged in at least two pairs of vees extending between the first and second housings. The side panels and the filter elements comprise a unitary disposable filter, wherein at least three filter elements have a unique orientation relative to the flow direction.

In another embodiment, a V-bank filter includes a first side panel coupled to a second side panel in a spaced apart relation. The first and second side panels have parallel edges oriented perpendicular to a flow direction through the filter. A plurality of filter elements are coupled to the housing in at least two pairs of vees. The side panels and the filter elements comprise a unitary disposable filter. Each of the filter elements have a first end having an orientation perpendicular to the flow direction and adjacent the edges of the flanges. The first end of at least one filter element is spaced farther from the first edge of an adjacent filter element.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

The present invention provides a V-bank filter having low pressure drop. The low pressure drop of the V-bank filter beneficially reduces the operational cost of the filter without increasing the amount of filtration media, as compared to conventional designs. Although the filter is shown having mini-pleated filter elements, it is contemplated that the filter elements may be comprised of carbon beds or other gas phase filter medium. Additionally, it is also contemplated that the advantageous arrangement of filter element may be beneficially utilized for liquid phase filtration by using an appropriate filtering medium as the filter element.

Figure 1:
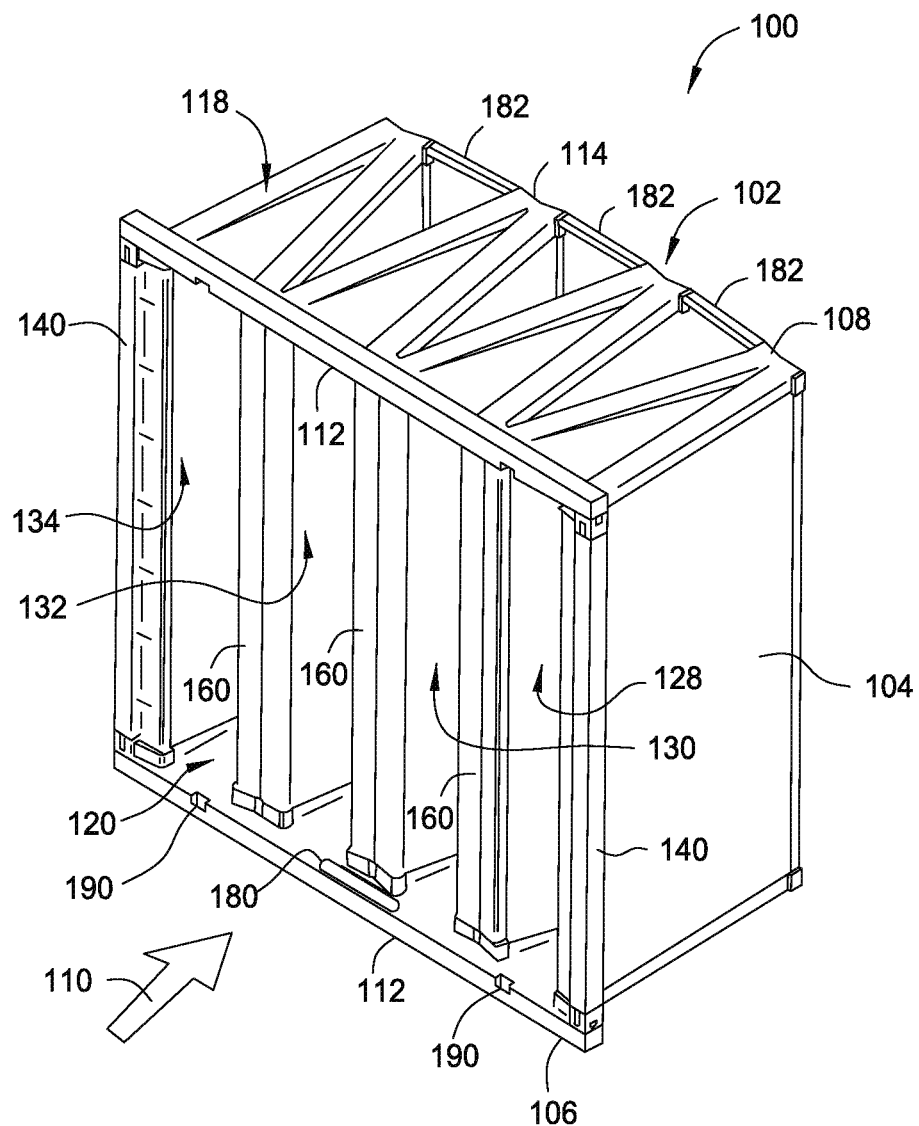
FIG. 1 is an isometric view of one embodiment of a V-bank filter of the present invention.

FIG. 1 is an exploded isometric view of one embodiment of a V-bank filter 100. The air flow direction through the filter 100 is indicated by arrow 110. The direction of the arrow 110 is orientated as v-type filters are typically utilized, but it is contemplated that flow direction through the filter 100 may be in the reverse direction.

The V-bank filter 100 includes a housing 102 containing a plurality of filter elements 104. In one embodiment, the housing 102 and filter elements 104 comprise a unitary replaceable filter. In another embodiment, the filter elements 104 may be selectively replaced from the housing 102.

In the embodiment depicted in FIG. 1, the housing 102 includes a first side panel 106 and a second side panel 108. The side panels 106, 108 may be fabricated from a metal, wood, plastic or other suitable material. In one embodiment, the side panels 106, 108 are fabricated from polymer. In another embodiment, the side panels 106, 108 are fabricated from an environmentally friendly and/or combustible material, for example metal, wood, plastic and/or cardboard.

The filter element 104 generally has, but is not limited to, a rectangular form. The filter element 104 may be a pleated pack of filtration media. Un-pleated filter elements are also contemplated. The filtration media comprising the filter element 104 may be a glass-based media or synthetic media suitable media. The filtration media may include antibacterial, antifungal, gas phase absorbent or other additive. The filter element 104 may be suitable for at least one of liquid phase, gas phase, particulate or molecular filtration. In one embodiment, the filter element 104 may be a molecular filtration media, such as bed of carbon or other gas phase absorber.

Figure 2:
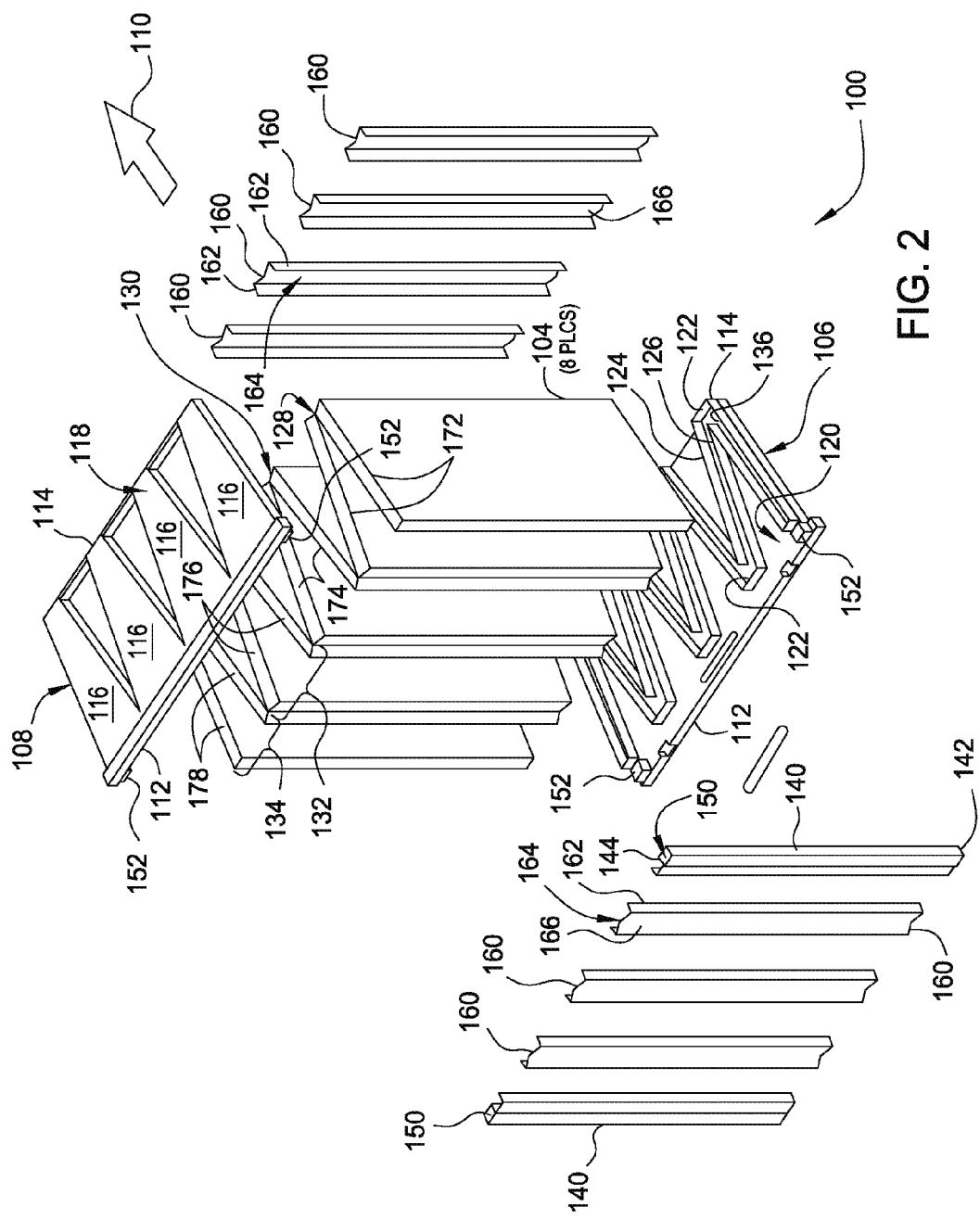
FIG. 2 is an exploded isometric view of the V-bank filter of FIG. 1.

The side panels 106, 108 include parallel first edges 112 that are oriented substantially perpendicular to the flow direction 110. The first edges 112 may be substantially parallel to each other. The second edges 114 of the side panels 106, 108 may be configured in a plurality of v-shaped extensions 116 which accommodate a portion of the filter elements 102. In such an embodiment, the second edge 114 may be defined by connecting the ends of the v-space extensions 116. The second edge 116 may be parallel to the first edge 114, or in another embodiment, have a curved configuration relative to the first edge 114. The side panels 106, 108 include an exterior side 118 and an interior side 120. The interior side 120 of each side panel 106, 108 faces the filter elements 104. The interior side 120 of each side panel 106, 108 includes a pair of spaced flanges 124, 126 at least partially arranged in an accordion fashion to maintain at least two pairs of the filter elements 104 in at least two banks of vees, shown as four V-banks 128, 130, 132, 134 in FIGS. 1-2.

The flanges 124, 126 generally define a trough 136 which retains the ends of the filter elements 104. The edges of the trough 136 closest the first and second edges 112, 114 of the panels 106, 108 are bounded by a flange 122 that connect adjacent pairs of flanges 124, 126, while of the edges of the trough opposing the flanges 122 are defined at an intersection of the opposing adjacent of flanges 124, 126.

The trough 136 may optionally confine a sealant (not shown) that may be used to provide a seal between the filter elements 104 and the side panels 106, 108. The sealant may be an adhesive, potting compound, gasket, gel, adhesive tape, foam, high loft media or other suitable sealing material. Depending on the design efficiency rating the filter, the seal may be air tight or allow some by-pass.

The side panels 106, 108 are maintained in a spaced apart relation by a pair of end channels 140. Each end channel 140 is coupled at a first end 142 to the side panel 106 and at a second end 144 to the side panel 108. The end channel 140 may be fabricated from metal, plastic, wood product or other suitable material. The end channel 140 may be fabricated from multiple components.

In the embodiment depicted in FIG. 1, each end channel 140 includes a female feature 150 that accepts a mating male feature 152 of the side panel. The female feature 150 may be a channel, slot, hole or other suitable form. The male feature 152 may be a boss, tab or other shape/profile projecting from the side panel suitable for engaging the female feature 150.

Figure 3:
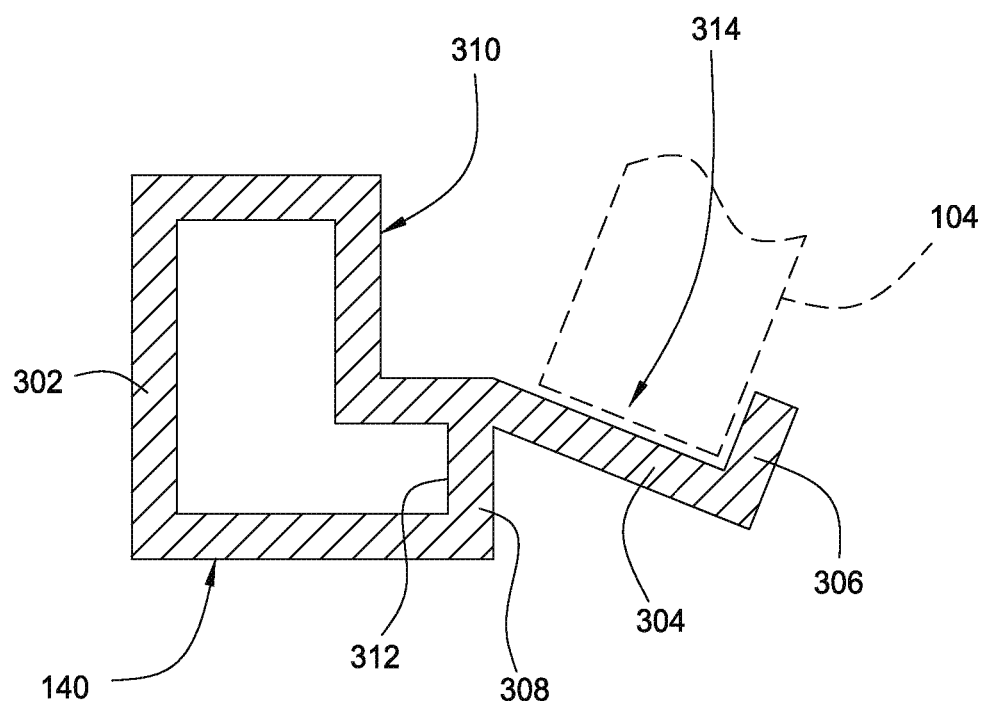
FIG. 3 is a sectional view of one embodiment of an end channel.

FIG. 3 is a sectional view of one embodiment of the end channel 140. The end channel 140 includes a main body 302 and a flange 304. The main body 302 is elongated in a direction perpendicular to the plane of the sectional view of FIG. 3. The flange 304 extends from the main body 302 to a lip 306. The flange 304 is generally wide enough to accept the filter element 104, which is shown in phantom in FIG. 3.

In the embodiment depicted in FIG. 3, the flange 304 extends from a first side 308 of the body 302. The first side 308 includes a sealant guiding feature 310 and a wall 312. The sealant guiding feature 310 is on the same side of the flange 302 as the lip 306. The sealant guiding feature 310 is generally inward of the wall 312 relative to the flange 302. The sealant guiding feature 310 generally directs sealant into a trough 314 defined between the main body 302, flange 304 and lip 306. In conventional designs not having a sealant guiding feature 310, the conventional flanges must be wide enough to allow sealant to flow into the filter elements with minimal wetting in order to prevent increasing the pressure drop through the filter. Since the sealant guiding feature 310 is inward of the flange 302, the filter elements 104 may be positioned much closer to the main body 308 of the end channel 140 as compared to the conventional designs. This outward positioning of the filter elements 104 enables enhanced spacing of the filter elements 104 comprising the V-banks, which contributes to the improved filter performance as further discussed below In one embodiment, the sealant guiding feature 310 is a step or other recess formed in the body 302 of the channel 140.

Returning to FIGS. 1-2, the filter elements 104 are arranged in at least two pairs of vees. In the embodiment depicted in FIGS. 1-2, a pair 172 of filter elements 104 are arranged in a first vee, a second pair 174 of filter elements are arranged in a second vee, a third pair 176 of filter elements are arranged in a third vee, while a fourth pair 178 of filter elements are arranged in a fourth vee. An end cap 160 is disposed in the vertices of each pair of filter elements. The end cap 160 includes an elongated body 166 having opposing lips 162 which define a channel 164. The channel 164 is wide enough to accommodate the ends of the filter elements 104 comprising the vee-pair, while narrow enough to fit within the trough 136 of the side panels adjacent the flange 122. The lips 162 are generally high enough to retain a sealant (not shown) dispensed into the end cap 160 which seals the adjacent filter elements 104. Alternatively, a sealant as described above may be disposed in the channel to sealingly interface with the filter media.

Figure 9A:
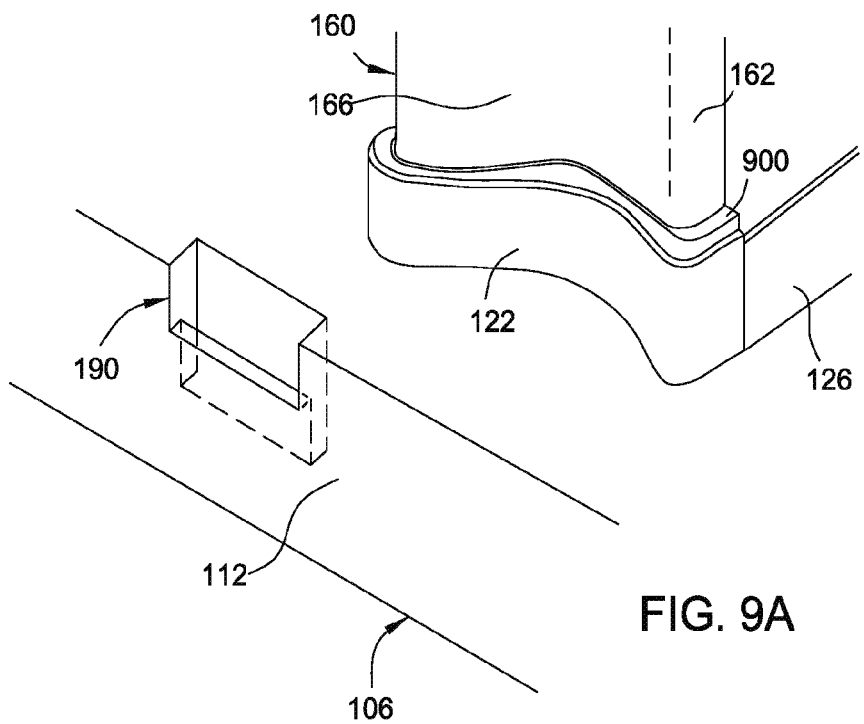
FIG. 9A is a partial isometric view of the V-bank filter of FIG. 1.
Figure 9B:
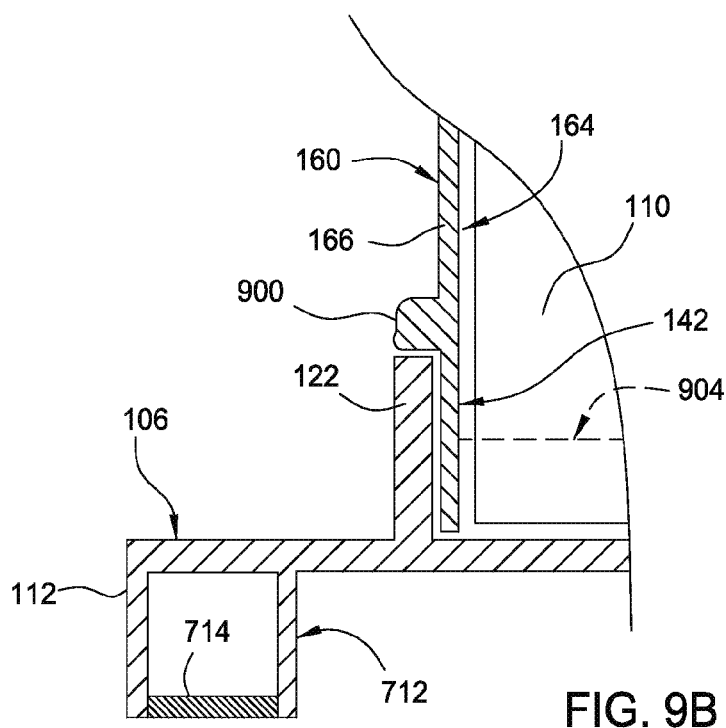
FIG. 9B is a partial sectional view of the V-bank filter of FIG. 1.

FIGS. 9A-B depict one embodiment of the end cap 160 in greater detail at the joint between the end cap 160 and first panel 106. The end cap 160 generally includes a flange 900 at the end 142. The end 144, not shown in FIGS. 9A-B, also includes a flange 900. The flange 900 extends from the side of the end cap 160 opposite the channel 164. The flange 900 is generally perpendicular relative to the orientation of the elongated body 166 and extends across the body 166 and both flanges 162. The flange 900 projects form the end cap 160 a distance sufficient to cover at least a portion of the flange 122. The flange 900 prevents leakage of sealant (shown by dashed line 904 in FIG. 9B) from seeping between the flange 122 and end cap 160.

Figure 4:
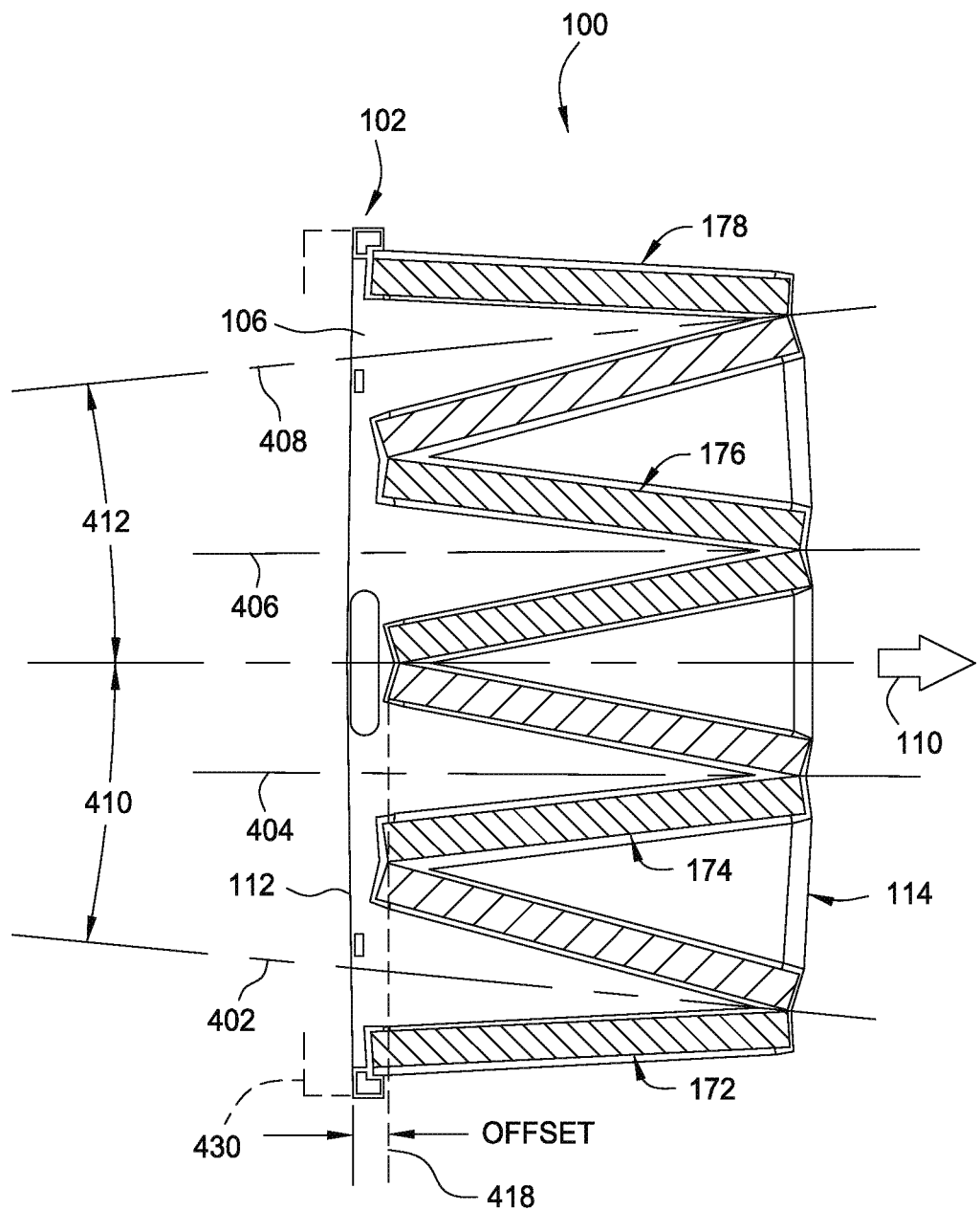
FIG. 4 is a sectional view of the V-bank filter trading one embodiment of an orientation of the filter elements comprising vee pairs.

FIG. 4 is a sectional view of the filter 100 illustrating one embodiment of an orientation of the filter elements 104 comprising the vee pairs 172, 174, 176, 178. Each vee pair 172, 174, 176, 178 has a centerline 402, 404, 406, 408 defined midway between the elements 104 comprising a vee pair. At least the outer centerlines 402, 408 are orientated at an acute angle 410, 412 relative to a centerline 414 of the filter 100. The centerline 414 of the filter 100 is generally aligned with the flow direction indicated by arrow 110 and perpendicular to the first edge 112. This flared orientation of the outer vee pairs 172, 178 provides more space between the vees on the downstream side of the filter 100, which reduces dynamic effects that contribute to pressure drop.

Thus, the filter 100 has a lower pressure drop as compared to conventional filters having parallel vee centerlines.

In the embodiment depicted in FIG. 4, the centerlines 402, 404, 406, 408 of the vee pairs 172, 174, 176, 178 have a polar orientation, converging at a common origin located upstream of the filter 100. For example, the common origin may be located on the filter centerline 414.

Figure 5A:
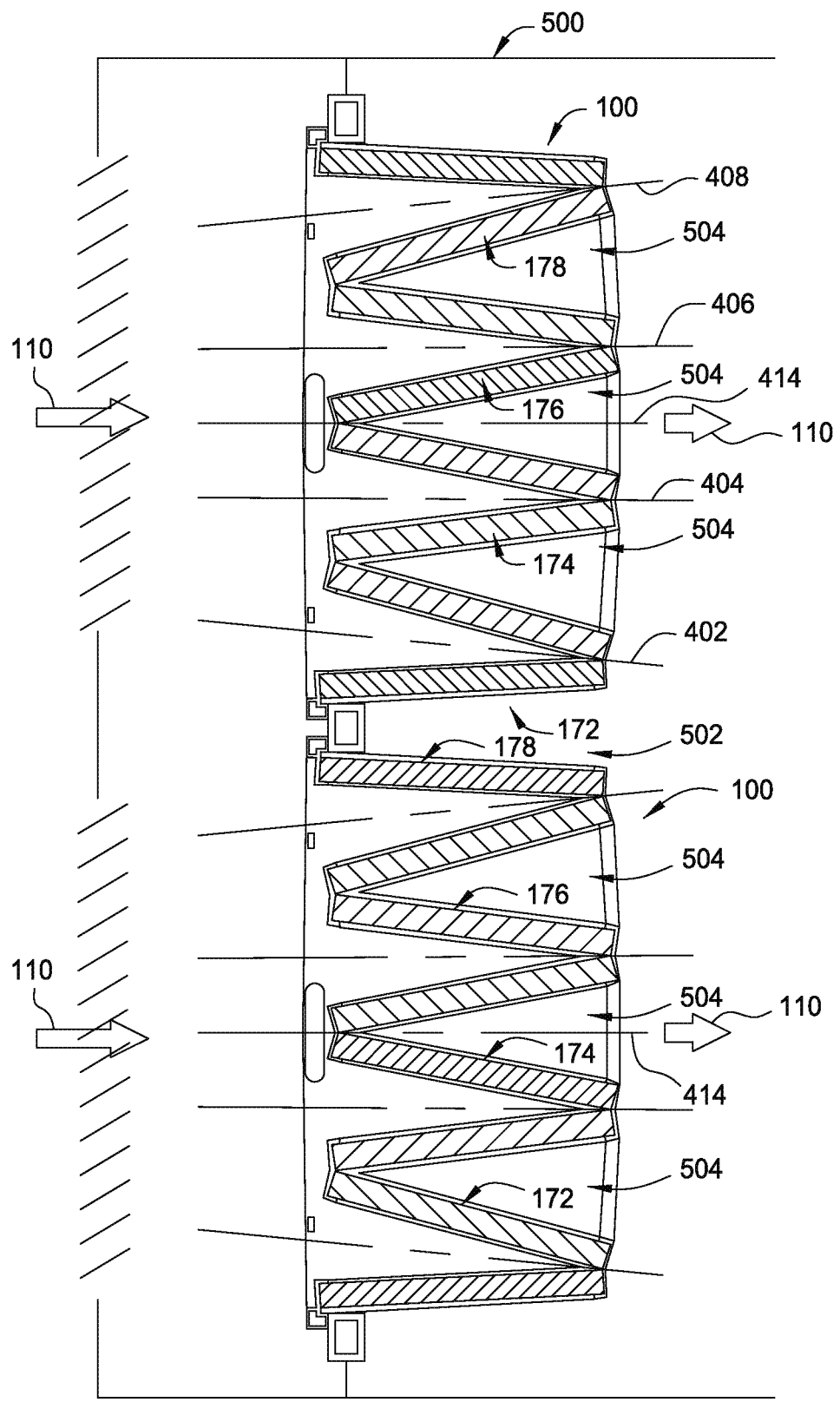
FIG. 5A is a partial sectional view an embodiment of an air handler adjacent the bank filters.

FIG. 5A is a partial sectional view of one embodiment of an air handler 500 through two adjacent V-bank filters 100. The filters 100 have parallel centerlines 414. The polar orientation of the centerlines 402, 404, 406, 408 of the vee pairs 172, 174, 176, 178 proves improved spacing between the adjacent vees of each respective filter. FIG. 5A illustrates that a space 502 between the outer vees 172, 178 of the adjacent filters 100, although smaller than found in conventional designs, is relatively large compared to a space 504 defined between vees of an individual filter. Thus, the flaring of the centerline 402, 404, 406, 408 results in redistributing some of the space 502 to the spaces 504, thereby creating better distribution of flow exiting the filter that result in reduced pressure drop.

Figure 5B:
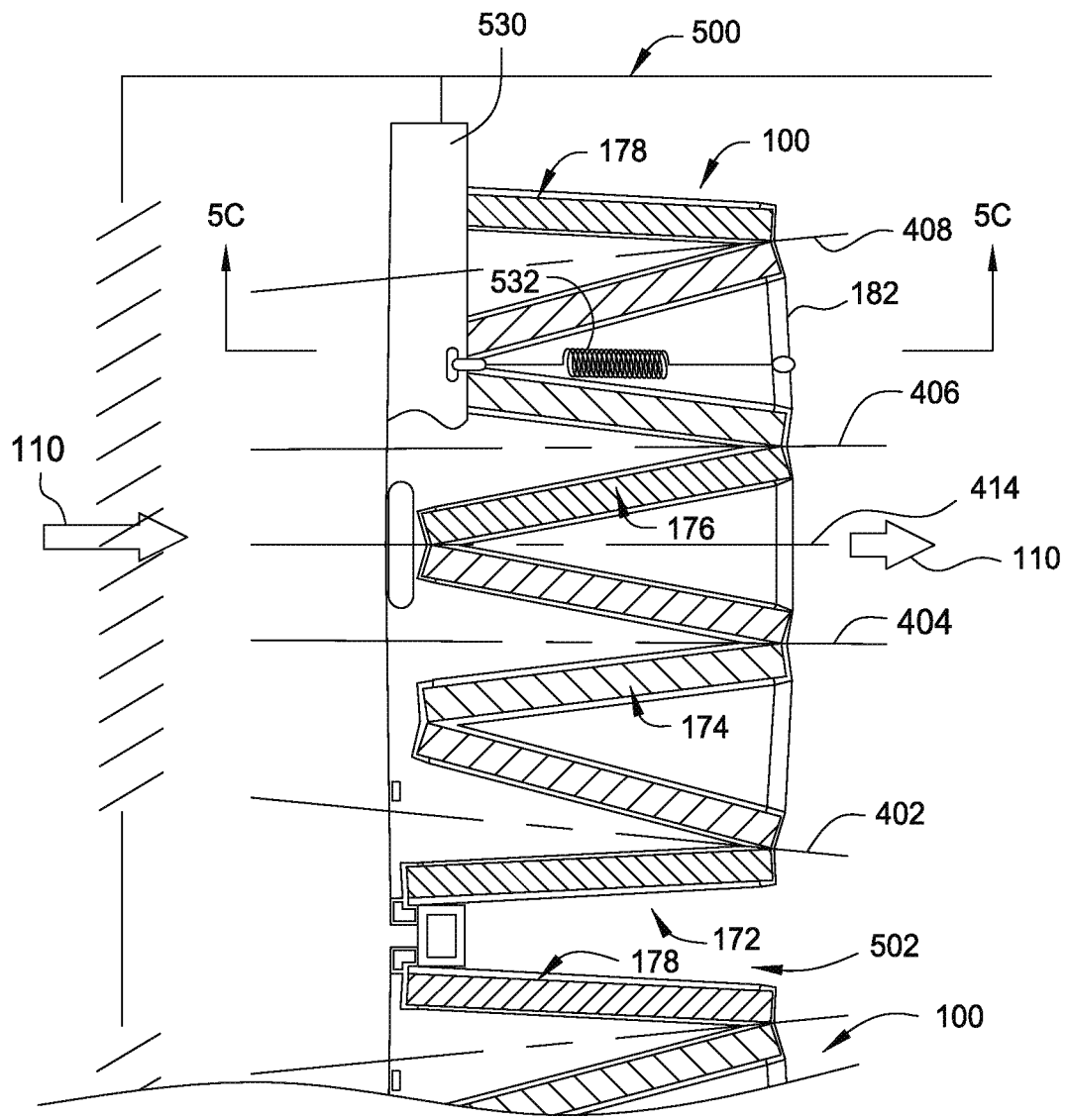
FIG. 5B is a enlarged view of a portion of FIG. 5A.
Figure 5C:
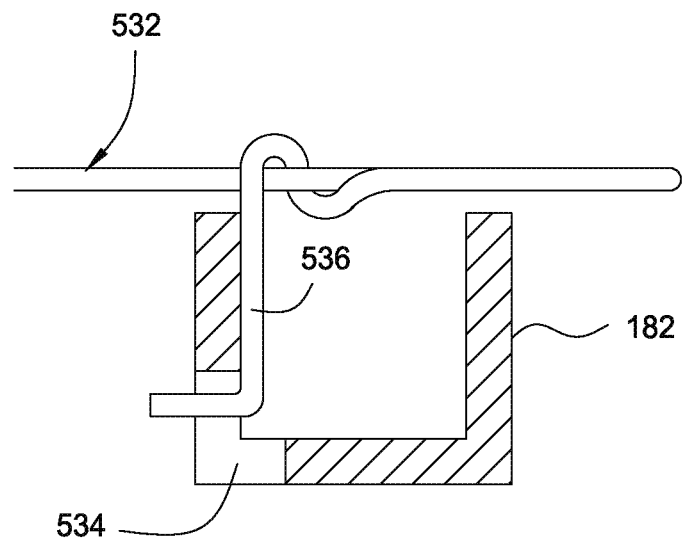
FIG. 5C is a sectional view of one embodiment of handle taken through section line 5C-5C of FIG. 5B.
Figure 5D:
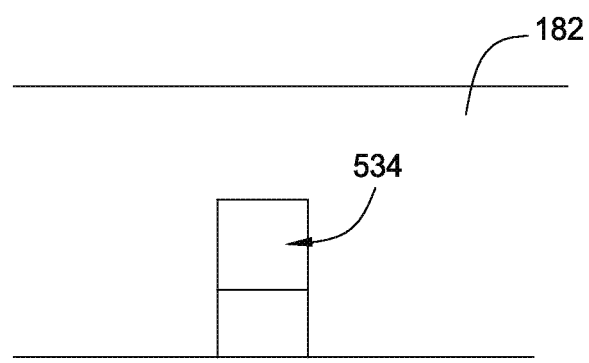
FIG. 5D is a partial elevation of the handle of FIG. 5C.

Referring additionally to FIGS. 5B-D, the handle 182 includes a feature 534 that allows a spring clip 532 to hold the filter to a holding frame 530 of the air handler 500 or other mounting surface. The feature of the handle 182 configured to hold the clip 532 may be a lip, notch, slot, aperture, hole or other suitable geometric feature.

In one embodiment, the feature 534 is an aperture formed through the handle 182. The feature 534 is on the side of the handle 182 facing the filter elements 104 and at least a portion of the passage defined through the feature 534 is open in a direction parallel with the flow direction 110 through the filter 100. The feature 534 is of a size sufficient to accommodate a wire hook 536 of the clip 530, thereby allowing the feature 534 to securely retain the clip 530 and accordingly the filter 100 to the holding frame 530.

Returning to FIG. 4, one or more of the filter elements 104 comprising the vee pairs 172, 174, 176, 178 may optionally be offset from the first edge 112, as shown by phantom line 418. The offset allows additional space for air entering between the filter elements 104, which contributes to reducing the pressure drop through the filter 100. In one embodiment, all of the vee pairs 172, 174, 176, 178 are offset at least about 12.5 mm from the first edge 112. In another embodiment, the inner vee pairs 174, 176 are offset further from the first edge 112 than the outer vee pairs 172, 178. In yet another embodiment, an imaginary line through the offset ends of the vee pairs 172, 174, 176, 178 has a substantially arc-shaped orientation. This contribution to reduced pressure drop is particularly in applications wherein a prefilter 430 (shown in phantom in FIG. 4) is positioned closely to or abutting the first edge 112 of the filter 100.

Figure 6:
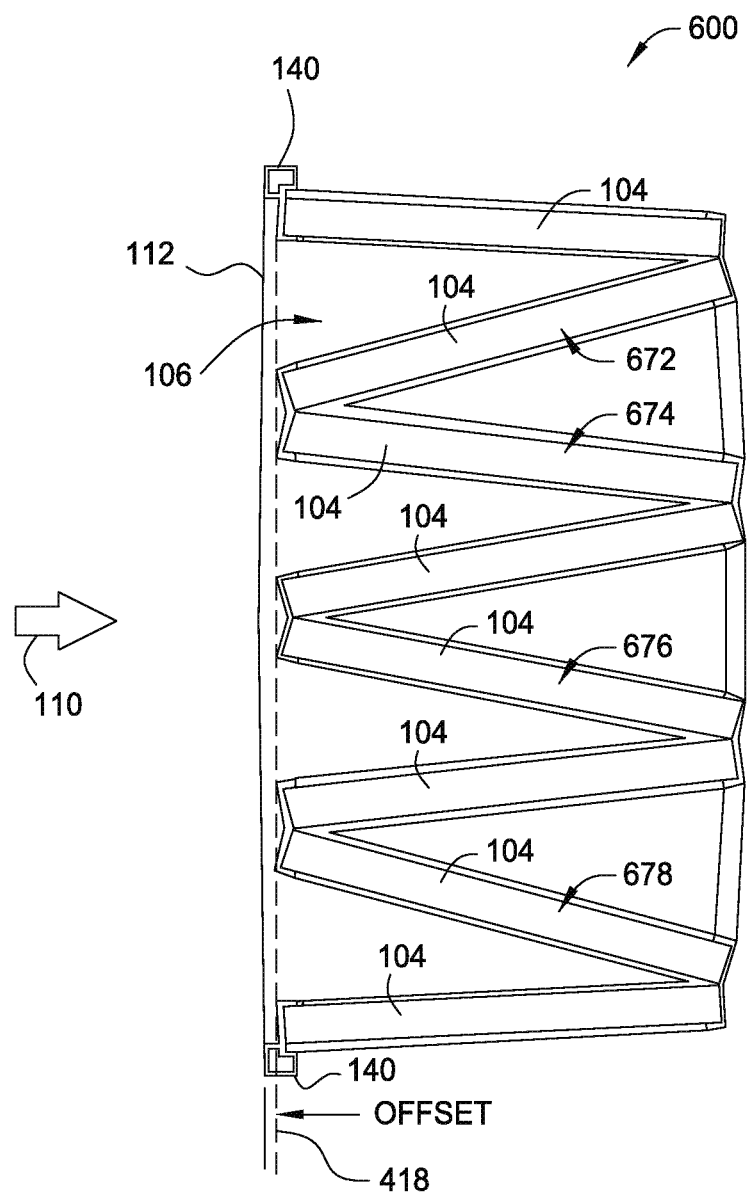
FIG. 6 is a sectional view of a V-bank filter illustrating another embodiment of an orientation of the filter elements.

FIG. 6 is a sectional view of a V-bank filter 600 illustrating another embodiment of an orientation of the filter elements 104 comprising four vee pairs 672, 674, 676, 678. In one embodiment, none of the filter elements 104 comprising the vee pairs 672, 674, 676, 678 have a parallel orientation. In another embodiment, at least one filter element 104 of a first vee pair is not parallel to its corresponding filter element 100 of a neighboring vee pair.

In yet another embodiment, the four vee pairs 672, 674, 676, 678 having centerlines having a orientated at an acute angle relative to a centerline of the filter 600. In still another embodiment, the two filter elements 104 comprising the outer vee pairs 672, 678 have different depths as measured through the filter element from the imaginary line 148 to the second edge 114 of the filter 600. In a further embodiment, the filter element 104 closest to the filter centerline of a respective vee pair 672, 674, 676, 678 has a depths as measured through the filter element from the imaginary line 148 to the second edge 114 of the filter 600 greater than the filter element 104 of closer to the edge of the filter 600.

Returning to FIG. 1, a handle 180 is provided on the interior side 120 of the side panels 106, 108 adjacent the first edge 112. The handle 180 may be a separate element secured to the interior side of the side panels 106, 108, or be a feature integrally molded in the side panels 106, 108. Optionally, the filter 100 may include one or more handles 182 disposed between the v-shaped extensions 116 defined along the second edge 114 of the panels 106, 108. In one embodiment, three handles 182 are defined by a web of material that is an integrally molded feature on each of the panel 106, 108.

Figure 7:
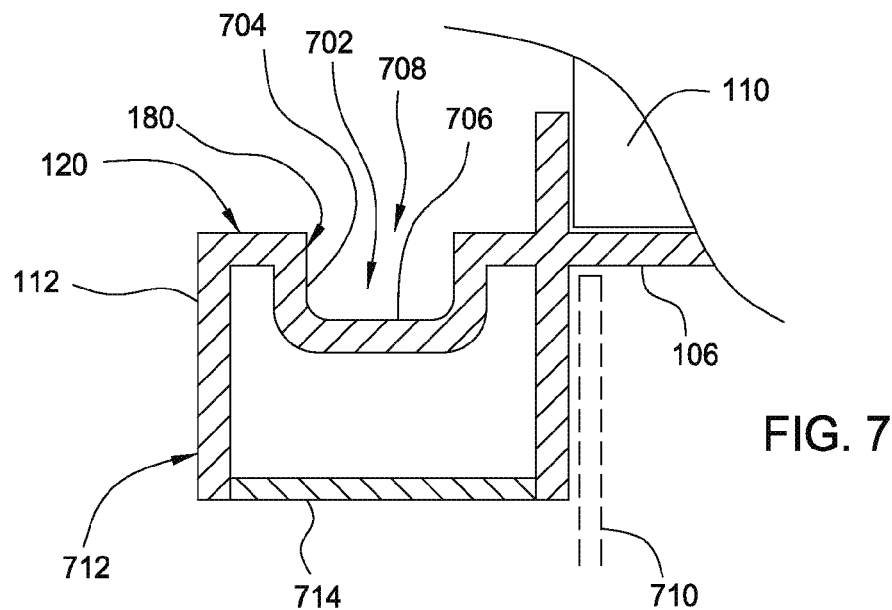
FIG. 7 depicts a partial sectional view of a side panel of V-bank filter illustrating one embodiment of a handle.

FIG. 7 depicts a partial sectional view of the side panel 106 through the handle 180. In the embodiment depicted in FIG. 7, the handle 180 is part of the molded panel 106. The handle 180 is comprised of a recess 702 bounded by sidewall 704 and a bottom wall 706. An opening 708 of the recess 702 is on the interior side 120 of the side panel 106. Thus, air or other medium passing through the filter 100 cannot leak through side panel 106 through the recess 702 of the handle 180.

Moreover, the inwardly facing orientation of the handle 180 protects the filter elements 104 from being damaged while the filter 100 is being handled. For example, a typical filter installation, such as in a holding frame 710 as shown in phantom in FIG. 7, only exposes the upstream face of the filter 100. The inwardly facing handle 180 has an orientation that is easily grasped by a technician from the exposed upstream side of the filter 100. Since the handle 180 is upstream of the filter elements 104 (e.g., the handle 180 between the flange 122 and the first edge 112 of the panel 106), the technician does not have to reach between the filter elements 104 to grasp the filter 100, thereby greatly reducing the chance of damaging the filter elements.

Also illustrated in FIG. 7 is a header 712 utilized to facilitate installation and/or sealing of the filter 100. The header 712 is generally a flange, box or rectangular form extending around the periphery of the filter 100. In the embodiment shown in FIG. 7, the header 712 includes a cover 714 that hides the ribs of the molded side panel 106 used to strengthen the header 712. In one embodiment, the header 712 is part of the side panels 106, 108 and channels 140.

Returning to FIG. 1, the filter 100 may also include a prefilter retaining feature 190. The prefilter retaining feature 190 is accessible from the interior side 120 of the side panel 106. The prefilter retaining feature 190 does not penetrate the material of the side panel 106, and as such, does not create a leak path through the panel 106. In one embodiment, at least two prefilter retaining features 190 are located along the adjacent the first edge 112.

Figure 8:
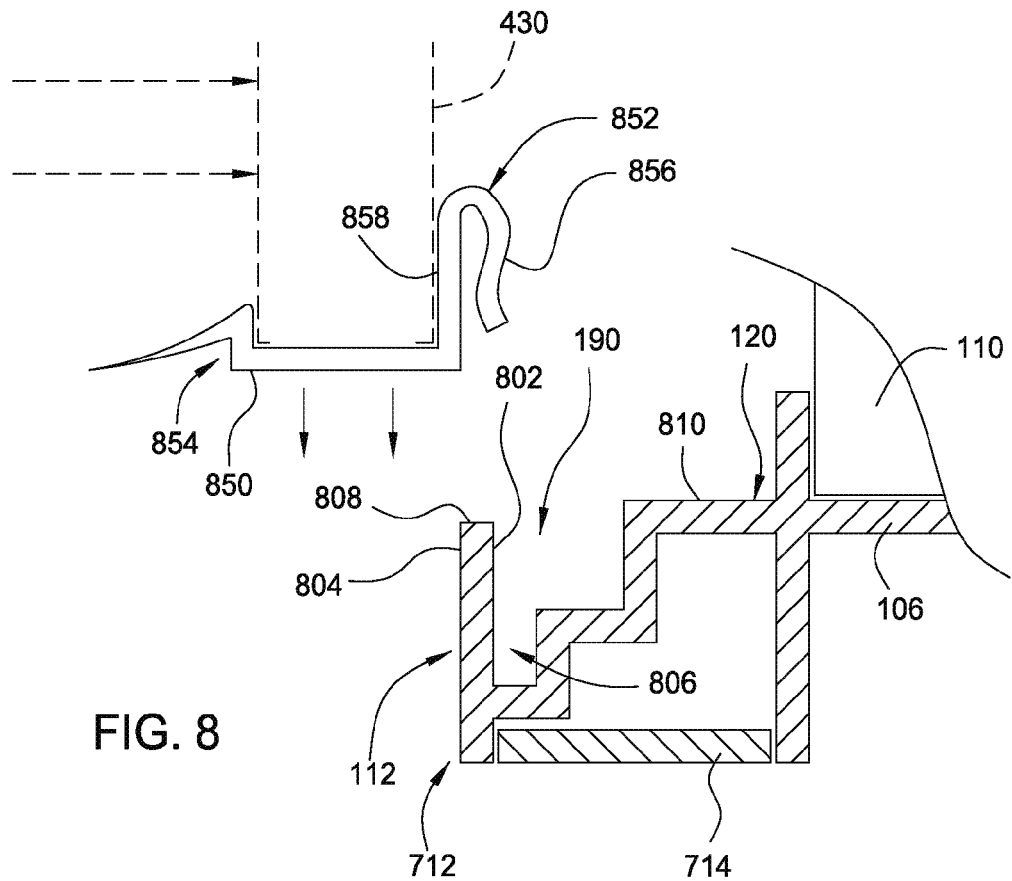
FIG. 8 depicts a sectional view of a side panel through one embodiment of a pre-filter retaining feature.

FIG. 8 depicts a partial sectional view of the side panel 106 through one embodiment of the prefilter retaining feature 190. In one embodiment, the prefilter retaining feature 190 includes a blind recess accessible from the interior side of the filter. As such, the prefilter retaining feature 190 is accessible to a technician even after the filter has been installed while not draining any leak pass through the side panel 106 of the filter 100.

In the embodiment depicted in FIG. 8, the recess of the prefilter retaining feature 190 includes a front wall 802 having an orientation substantially the same as the outer edge 804 of the first edge 112 of the side panel 106. In one embodiment, the front wall 802 is substantially parallel with the outer edge 804 of the side panel 106. In one embodiment, the recess includes a slot 806. The slot 806 of recess generally has a width sufficient to engage a filter retaining clip 850.

The filter retaining clip 850 generally has a U-shaped spring clip 852 at one end and a prefilter engaging feature 854 at a second end. An outer leg 856 of the U-shaped spring dip 852 is configured to be inserted into the slot 806 of the filter retaining feature 190, abutting against the front wall 802. An inner leg 858 of the U-shaped clip 852 abuts against the outer edge 804 of the first edge 112 of the side panel 106. The distance between the legs 856, 858 is such that the spring clip 852 is deflected and grips the portion of the side panel disposed between the outer wall 804 and the front wall 802 to retain the clip 850 in a cantilevered orientation projecting form the first edge 112 of the side panel 106. A notch 808 may be formed in the side panel 106 between the filter retaining feature 190 and the outside surface the outer wall 804, such that the retaining clip 850 does not extend beyond an inside surface 810 of the side panel 106. Thus, the notch 808 allows the clip 850 to be recessed from the path of the air passing through the filter 100, contributing, abet in a small way, to the overall reduced pressure drop of the filter.

Thus, a V-bank filter having improved pressure drop performance over conventional V-bank filters has been provided. Advantageously, the design of the filter reduces dynamic airflow pressure losses through the filter resulting in about a 15 percent reduction to total pressure drop through the filter compared to similarly configured V-bank filters. Additional pressure drop reductions may be achieved through changes to the media and pleating considerations. Additionally, the handle and prefilter attachment features being accessible from the interior of the filter provide an additional ease of handling which facilitates change-out and replacement of the V-bank filter. Moreover, as the handle and prefilter retaining feature are positioned upstream of the filer elements, the potential of damage to the filtering elements during installation is minimized.

Although various embodiments which incorporate the teachings of the present invention have been shown and described in detail herein, those skilled in the art can readily devise many other varied embodiment that still incorporate these teachings.

What is claimed is:

1. A V-bank filter comprising:
a first side panel;
a second side panel, the first and second side panels having parallel first edges oriented perpendicular to a flow direction through the filter; and
a plurality of filter elements arranged in pairs of vees extending between the first and second side panels, the first side panel, second side panel, and the filter elements comprising a unitary disposable filter, wherein the plurality of filter elements comprises:
a first filter element in a first vee pair,
a second filter element in the first vee pair, and
a third filter element in a second vee pair, wherein each of the first filter element, second filter element and third filter element has a unique orientation direction relative to the flow direction, and
wherein the V-bank filter comprises a filter inlet located at an upstream end of each of the first and second side panels and a filter outlet located at a downstream end of each of the first and second side panels, wherein the flow direction through the filter inlet is substantially parallel to a flow direction through the filter outlet, and wherein the unique orientation of the first filter element, the second filter element and the third filter element comprises:
a first orientation direction extending in the direction from the inlet to the outlet through a centerline of the first filter element;
a second orientation direction extending in the direction from the inlet to the outlet through a centerline of the second filter element; and
a third orientation direction extending in the direction from the inlet to the outlet through a centerline of the third filter element, wherein none of the first orientation direction, second orientation direction or third orientation direction are parallel.

2. The V-bank filter of claim 1 further comprising:
an elongated tubular member coupling the first and second side panels;
a flange extending from the tubular member to an upturned lip and defining a filter element receiving trough, the trough substantially equal in width to a pleat height of the filter element; and
a sealant guiding feature formed in the elongated tubular member configured to direct adhesive into the trough.

3. The V-bank filter of claim 1, wherein the first side panel further comprises:
an interior side facing the filter elements; and
a first handle accessible from the interior side of the first side panel.

4. The V-bank filter of claim 3, wherein the first handle does not provide a leak path through the first side panel.

5. The V-bank filter of claim 3, wherein the first handle is an elongated recess formed in but not through the first side panel.

6. The V-bank filter of claim 1, wherein the housing further comprises: a plurality of blind clip retaining features.

7. The V-bank filter of claim 1, wherein each blind clip retaining feature comprises:
a blind slot formed in the first side panel, the slot having a front wall adjacent and perpendicular to an edge of the first side panel; and
a notch formed in the housing between the slot and the edge of the housing.

8. The V-bank filter of claim 1, further comprising:
a pre-filter secured to the first edges of the first and second side panels.

9. The V-bank filter of claim 8, wherein the prefilter is spaced apart from the filter elements upstream and adjacent to the first side panel.

10. The V-bank filter of claim 1, wherein the first, second and third filter elements each comprise a first end wherein each first end is offset from the first edges of the first and second side panels in a substantially arc-shaped orientation.

11. A V-bank filter comprising:
a first side panel;
a second side panel coupled to the first side panel in a spaced apart relation, the first and second side panels having parallel edges oriented perpendicular to a flow direction through the filter; and
a plurality of filter elements coupled to a housing in at least two pairs of vees, the first side panel, second side panel, and the filter elements comprising a unitary disposable filter, each of the filter elements has a first end having an orientation perpendicular to the flow direction and adjacent the edges of the first and second side panels, wherein the first end of at least one filter element is spaced farther from the edges of the side panels than the first end of an adjacent filter element, and the housing having a filter inlet and a filter outlet wherein the flow direction through the filter inlet is substantially parallel to a flow direction through the filter outlet, wherein the first ends of the filter elements are offset from the edges of the side panels in a substantially arc-shaped orientation.

12. The V-bank filter of claim 11, wherein the first ends of the filter elements are arranged in a radial orientation.

\* \* \* \* \*